United States Patent

Sher et al.

[11] Patent Number: 5,970,510
[45] Date of Patent: *Oct. 19, 1999

[54] DISTRIBUTED MEMORY ADDRESSING SYSTEM

[75] Inventors: Richard A. Sher, Huntington; Jerry Rogers, Seaford; Mark J. Wentka, East Northport, all of N.Y.

[73] Assignee: Northrop Grumman Corporation, Los Angeles, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/629,839

[22] Filed: Apr. 10, 1996

[51] Int. Cl.[6] ........................................ G06F 9/45
[52] U.S. Cl. ............................ 711/149; 709/100
[58] Field of Search ..................... 709/102, 100, 709/800.11, 106; 711/149, 203, 202

[56] References Cited

U.S. PATENT DOCUMENTS

| | | | |
|---|---|---|---|
| 4,803,485 | 2/1989 | Rypinski | 340/825.05 |
| 4,972,314 | 11/1990 | Getzinger | 711/149 |
| 5,325,526 | 6/1994 | Cameron et al. | 395/672 |
| 5,384,773 | 1/1995 | Olnowich et al. | 365/189.01 |
| 5,535,373 | 7/1996 | Olnowich | 395/500 |
| 5,696,922 | 12/1997 | Fromm | 711/5 |

*Primary Examiner*—Majid A. Banankhah
*Attorney, Agent, or Firm*—Terry J. Anderson; Karl J. Hoch, Jr.

[57] ABSTRACT

A distributed memory addressing system has a plurality of separate processing elements. Each processing element has at least one CPU. A shared memory is utilized to store data to be used by the separate processing elements, as required. A high bandwidth interface interconnects processing elements and the shared memory. The high bandwidth interface is configured so as to provide non-blocking access to the shared memory for each of the processing elements.

25 Claims, 3 Drawing Sheets

DISTRIBUTED MEMORY ADDRESSING SYSTEM

FIELD OF THE INVENTION

The present invention relates generally to computer memories and more particularly to a distributed memory addressing system for providing non-blocking access to global shared memory for multiple CPUs.

BACKGROUND OF THE INVENTION

The use of shared memories for multiple CPUs is well known in high-speed, parallel processor computing systems. The use of such shared memory facilitates parallel processing with each CPU having access to a common memory so as to expedite various CPU intensive computer functions such as Fourier analysis, digital filtering algorithms, machine vision and three-dimensional graphics. The use of such a contemporary shared memory allows each CPU to access those memory elements required for the CPU to carry out its program instructions and data manipulations.

Such shared memories may also be configured as distributed memories, wherein the data stored therein is divided among a plurality of memory banks, so as to enable parallel access thereto and also so as to provide a fail-safe structure for the memory device. As those skilled in the art will appreciate, by distributing the data across multiple memory banks, the data may be accessed more rapidly. That is, more of the data may be simultaneously accessed by a particular CPU.

A fail-safe structure for the memory device is provided since only a portion of the data is stored upon any particular parallel memory. Failure of a particular parallel memory thus results in the loss of only a portion of the data, which may typically be recovered utilizing contemporary error detection and correction methodology.

Although such contemporary shared memories have proven generally suitable for their intended purposes, they possess inherent deficiencies which detract from their overall performance. Most important among these inherent deficiencies is the inability of such contemporary shared memories to provide simultaneous access of a plurality of CPUs to the data stored therein. According to contemporary methodology, when one particular CPU is accessing data from the shared memories, then access to the shared memories by all other CPUs is temporarily blocked. The other CPUs must wait until the memory read cycle is complete before they can access the shared data. As those skilled in the art will appreciate, the blocking of access to the shared memory has a substantial adverse impact upon the computer's performance. Indeed, it has been estimated that computational efficiency is reduced to approximately 10–20 percent of its theoretical maximum value due to such memory access blocking.

Various attempts have been made in the prior art to improve memory access. One such attempt is disclosed in U.S. Pat. No. 5,134,695 issued on Jul. 28, 1992 to Ikeda and entitled METHOD AND APPARATUS FOR CONSTANT STRIDE ACCESSING TO MEMORIES IN VECTOR PROCESSOR. The Ikeda patent discloses a method for improving access to a plurality of reference memory banks, thereby enhancing memory access efficiency. However, Ikeda does not address simultaneously accessing shared memories by multiple CPUs and its implementation.

In view of the foregoing, it is beneficial to provide an implementation of a distributed memory addressing system wherein non-blocking access to shared memory is facilitated for multiple CPUs.

SUMMARY OF THE INVENTION

The present invention specifically addresses and alleviates the above-mentioned deficiencies associated with the prior art. More particularly, the present invention comprises a distributed memory addressing system for providing non-blocking access to a global shared memory for multiple CPUs and its method of implementation.

The distributed memory addressing system comprises a plurality of separate processing elements, wherein each processing element comprises at least one CPU. The shared memory is accessible by the CPU of each processing element. A high bandwidth interface interconnects the processing elements and the shared memory. The high bandwidth interface is configured so as to provide non-blocking access to the shared memory for each of the processing elements.

According to the preferred embodiment of the present invention, a node controller communicates with the processing elements and the shared memory and provides parameters to the shared memory which are indicative of memory addresses required by the processing elements in order for the processing elements to execute their respective portions of the program. The node controller preferably provides either a start address, an end address, and a stride or provides a start address, a distance, and a stride. A discussion of addressing in a distributed memory system which utilizes these parameters, i.e., start address, end address, distance, and stride, is provided in U.S. Pat. No. 5,134,695, issued on Jul. 28, 1992 to Ikeda and entitled METHOD AND APPARATUS FOR CONSTANT STRIDE ACCESSING TO MEMORIES IN VECTOR PROCESSOR, the contents of which are hereby incorporated by reference.

Each processing element preferably further comprises a local data memory for providing data to the CPU, and a local program memory for providing program instructions to the CPU. Each processing element optionally further comprises a peripheral interface to facilitate programming and display.

According to the preferred embodiment of the present invention, each of the processing elements preferably further comprises a data handler unit in communication with the CPUs thereof. The global shared memory preferably comprises a plurality separate of parallel memories. Each of the parallel memories comprises at least one bank of RAM and a memory manager unit in communication with the bank(s) of RAM. The high bandwidth interface comprises at least one serial connection between each of the processing elements and each of the parallel memories.

The global shared memory preferably comprises 8 to 32 individual parallel memories. Each parallel memory preferably comprises two banks of RAM. Each bank of RAM preferably comprises 2 to 8 mega 32 bit words.

The node controller is configured to accept a compiled flow graph, so as to facilitate processing of program instructions by the CPUs. As those skilled in the art will appreciate, such a flowgraph identifies how a particular program is broken down into tasks for each CPU, prioritizes such tasks, and defines the required memory accesses for each CPU.

Thus, according to the preferred embodiment of the present invention, the node controller is configured to schedule tasks to be performed by each CPU and is also configured so as to delegate those tasks to selected processing elements.

A node control bus interconnects all of the processing elements and all of the parallel memories of the global shared memory, so as to provide bi-directional communications therebetween. The node control bus is preferably configured as a token ring controlled bus wherein a token is passed from one processing element to the next, including the node controller. When the node controller requires access to the node controller bus, for example, the node controller waits to receive the token, then holds the token until all of the data is sent, and then releases the token, so as to permit control of the node control bus by another system element. In this way, all of the processing elements and parallel memories receive data transmitted on the node control bus. The first word of any data transmission preferably contains the destination address for the data, such that the data transmission only needs be acknowledged by that particular system element requiring such data.

According to the preferred embodiment of the present invention, three additional processing elements are dedicated solely to input/output functions. These input/output processing elements have the same configuration as the other processing elements, with additional circuitry so as to allow data to be input and output from the distributed memory addressing system. These input/output processing elements can be configured for any desired type of input/output required by the system. The input/output processing elements may also be utilized to provide a high speed link for inter-system communication.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

As those skilled in the art will appreciate, the throughput of vectors on array multi-processor architecture high speed computers used in signal processor designs and the like is usually constrained by the bandwidth of the internal bus structure thereof, since data communications between the global memory thereof and the processing elements thereof cannot maintain maximum execution speeds. This occurs since the transfer of data from the global memory to any of the processing elements must wait for the bus to be free in order to accept another data transfer, and also because the memory access must wait for the current read/write cycle to be complete in order to process a subsequent addressing request. Furthermore, only a single processor can initiate an address cycle in a sequential mode of operation. As discussed above, such construction necessitates memory blocking which inherently results in a reduction of theoretical maximum throughput by as much as 90 percent.

Figure 1:
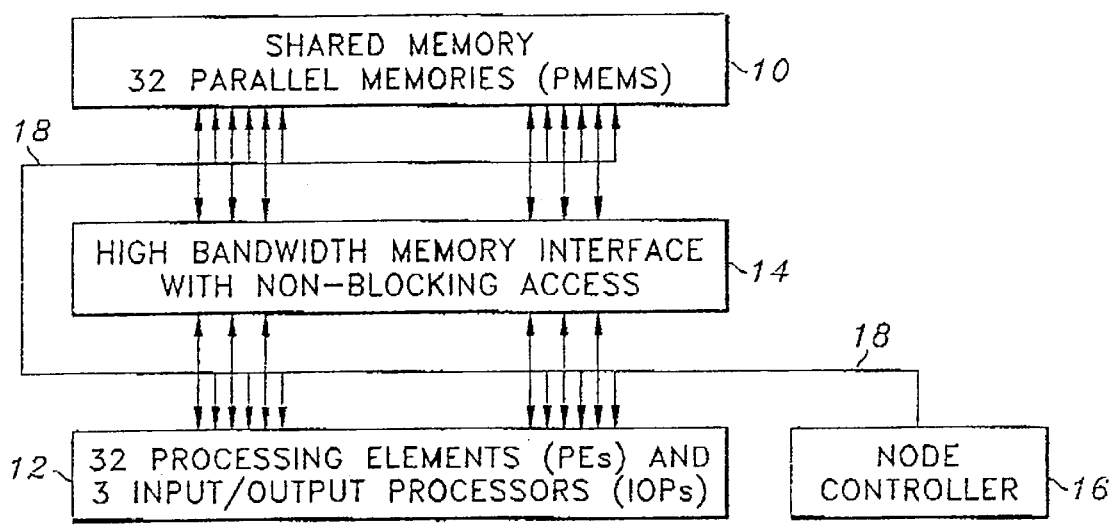
FIG. 1 is a high level block diagram of the distributed memory addressing system of the present invention.
Figure 2:
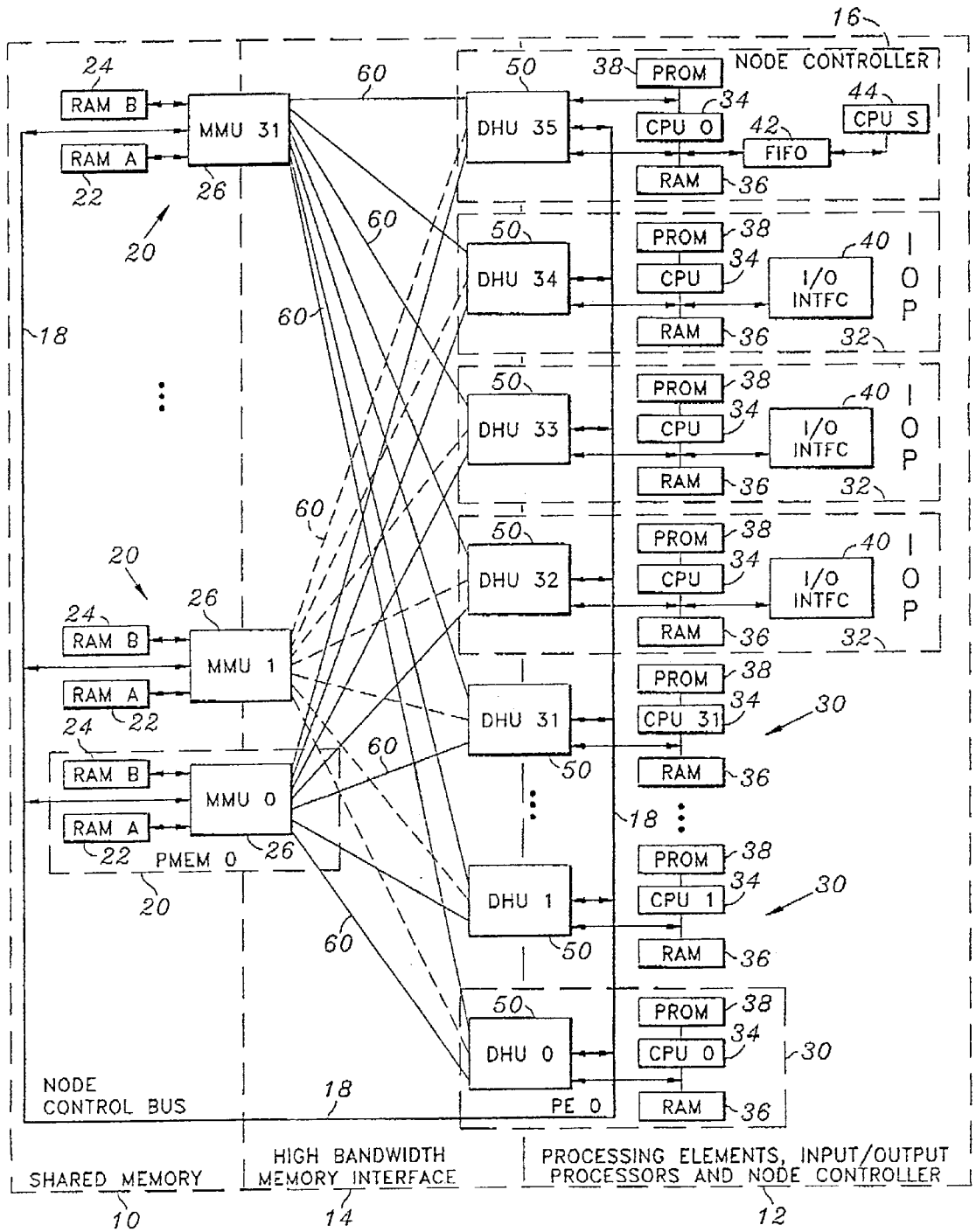
FIG. 2 is a detailed block diagram of the distributed memory addressing system of the present invention, showing the node architecture thereof.
Figure 3:
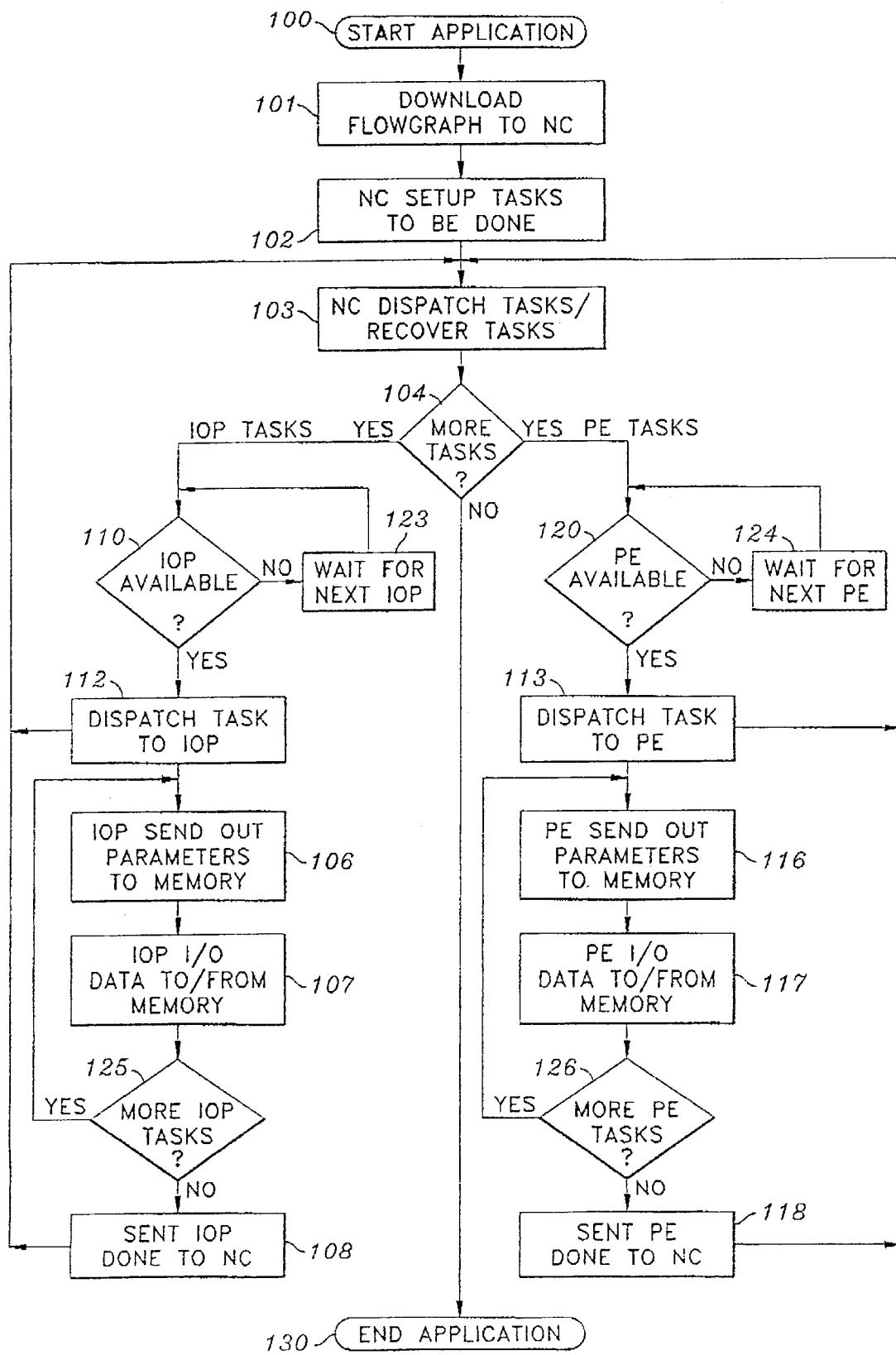
FIG. 3 is a functional block diagram illustrating the operation of the distributed memory addressing system of the present invention.

The distributed memory addressing system of the present invention is illustrated in FIGS. 1–3 which depict a presently preferred embodiment of the invention. The present invention provides a solution to the above-mentioned problem of memory blocking by providing an n-port memory design wherein the simultaneous addressing of each port is facilitated via time division multiplexing. Such construction facilitates both horizontal and vertical addressing of memory locations throughout the entire n-ports of memory address space. The data from each port is transferred from a port memory manager unit through dedicated serial lines to a data handler unit which then transfers the data to the CPU which requires the data.

The present invention addresses the implementation of such a distributed memory addressing system which identifies the memory addressing logic, the design for adjusting the number of memories and processors, and the non-contention of read/write circuits for the system. The present invention also facilitates the use of a graphical flow editor for ease of software development.

The present invention provides improved computational efficiency, from an industry standard of approximately 10 percent of rated throughput to over 70 percent for a broad set of advanced software algorithms used in real time applications. The present invention provides super high memory bandwidth access while also facilitating simultaneous non-blocking access to shared memory for all CPUs. The hardware of the present invention is easily scaled up or down, in a manner which is transparent to software development implementation. Maximum use is made of commercial-off-the-shelf (COTS) CPUs, memories, and input/output devices, so as to facilitate reduced costs and rapid prototyping for use in military applications. The architecture is designed so as to accommodate technology modernization. This is achieved by making the design accommodate new components in a simple matter.

Referring now to FIG. 1, the present invention generally comprises a shared memory 10 for servicing a plurality of processing elements 12. According to the preferred embodiment of the present invention, the shared memory 10 comprises 32 parallel memories and the processing elements 12 comprise 32 separate processing elements and 3 input/output processors (as shown in FIG. 2).

A high bandwidth interface 14 provides non-blocking access for each of the 32 processing elements and the 3 input/output processors, as well as a node controller 16, to each of the 32 parallel memories. The node controller 16 delegates tasks to the processing elements 12 via the node control bus 18.

Those skilled in the art will appreciate that the present invention can be conveniently scaled to accommodate various different numbers of parallel memories and processing elements, as desired. Thus, the use of 32 parallel memories and 32 processing elements along with 3 input/output processors and a node controller is by way of illustration only, and not by way of limitation.

As discussed in detail below, the shared memory 10 comprises a multi-port, multi-bank, non-cache based global shared memory 10. The shared memory implementation of the present invention facilitates non-interrupted access by all of the processing elements 12. The high bandwidth memory interface 14 provides the communication link between the shared memory 10 and the processing elements 12. According to the preferred embodiment of the present invention, the high bandwidth memory interface 14 utilizes a network of serial interconnections between memory management units 26 (FIG. 2) of the shared memory 10 and data handler units 50 (FIG. 2) of the processing elements 12. Transmission over the high bandwidth memory interface 14 comprises both processor element 12 read/write data, and embedded direction control commands. Use of this serial interconnection technique decreases the number of interconnecting signals, thereby providing denser system packaging.

The high bandwidth memory interface 14 is reconfigurable so as to accommodate flexible distributed memory addressing system configurations. Thus, the high bandwidth memory interface 14 supports various different numbers of processing elements and parallel memories, as discussed in detail below. The configuration of the distributed memory addressing system of the present invention is transparent to the user and does not effect the overall bandwidth of the system.

In order to provide such flexibility, the memory management unit 26 to data handler unit 50 serial connections are preferably modified in the following manner. Two serial wires from each data handler unit 50 are connected to each management unit 26 in a 32×32 distributed memory addressing system, 4 serial wires from each data handler unit 50 are connected to each memory management unit 26 in a 16×16 distributed memory addressing system and 8 wires from each data handler unit 50 are connected to each memory management unit 26 in an 8×8 distributed memory addressing system, for example. Thus, as the number of processing elements 30 and/or the number of parallel memories 20 are reduced, the number of interconnections therebetween are correspondingly increased, so as to maintain a desirable bandwidth, in order to facilitate desired intercommunications.

Referring now to FIG. 2, the distributed memory addressing system of the present invention is described in detail. According to the preferred embodiment of the present invention, the shared memory 10 comprises 32 separate parallel memories 20. Each parallel memory 20 comprises 2 banks of memory, i.e., RAM A 22 and RAM B 24. Each bank of memory 22 and 24 preferably comprises up to 8 mega 32 bit words. Those skilled in the art will appreciate that various other memory configurations are likewise suitable. For example, the shared memory 10 may alternatively comprise 8, 16, or 64 parallel memories; each parallel memory may alternatively comprise 1 or 2 banks of memory, and each bank of memory may alternatively comprise 16, 32, or 64 Megawords, each word comprising 32 or 64 bits, for example. Within each parallel memory 20, the two banks of memory 22 and 24 are in communication with a memory management unit 26.

The shared memory 10 thus comprises a multi-port, multi-bank, non-cache based global shared memory. The shared memory implementation of the present invention facilitates the simultaneous, non-interrupted access by all of the processing elements of the distributed memory addressing system.

Each memory management unit 26 receives a unique set of addressing parameters from each processing element 30 via the node control bus 18. The node control bus 18 is used by a local address generator within each memory management unit 26 to obtain the required data from the processing elements 30. This configuration facilitates the use of data queues for the distributed memory addressing system of the present invention to be distributed over all of the parallel memories 20, so as to facilitate the use of a non-blocking interface. Each memory management unit 26 also provides an interface between the two banks of memory, 22 and 24, and the high bandwidth memory interface 14.

According to the preferred embodiment of the present invention, the processing elements 12 comprise 32 individual processing elements 30, 3 individual input/output processing elements 32, and a single node controller 16.

The serial data and commands which are communicated over the high bandwidth interface 14 are two-way time division multiplexed so as to facilitate the access of all of the processing elements 30 to all of the parallel memories 20 in a non-blocking manner. This dual, time division multiplexed configuration allocates one time slot for each bit of data or command which is transferred. Each processing element 30, 32, and 16 is allocated one time slot for each parallel memory 20. The time slot allocated to each processing element 30, 32, and 16 is offset by one time slot for each piece of data communicated for a particular processing element 30, 32, and 16. The time slot for each processing element 30, 32, and 16 is also offset from the adjacent processing element 30, 32, and 16 by one time slot relative to a particular parallel memory 20.

The CPUs 34 are chosen based upon the specific specifications needed for a particular application. The type of CPU is transparent to the support circuitry of the distributed memory addressing system and also to the user.

Each data handler unit 50 comprises a local address generator and control logic to facilitate interface to the CPU 34 and to the node control bus 18, as well as to the high bandwidth memory interface 14. Each DHU receives tasks from the node controller 16 and passes related information to the processing element's CPU 34. The processing element's CPU 34 then decodes this information and sends the shared memory 10 desired addressing parameters via the data handler unit 50 associated therewith and the node control bus 18.

Preferably, the processing elements 12 comprise a plurality, preferably 3, of specialized processing elements which are specifically configured to perform input/output functions. These input/output processing elements 32 generally comprise the same configuration as the other processing elements 30, with additional circuitry to allow data to be input and output from the distributed memory addressing system. As those skilled in the art will appreciate, the input/output processing elements 32 can be configured for any desired type of input/output. The input/output processing elements 32 may also be utilized to provide a high-speed link for inter-distributed memory addressing system communication.

The node controller preferably utilizes a dual CPU 34 and 44 configuration, local data memory, local program memory (referred to collectively as RAM 36), peripheral interfaces utilized for programming and display, and a data handler unit 50. First-in-first-out (FIFO) memory buffer facilitates communication between CPU 44 and CPU 34 of the node controller. Particular CPUs are chosen based upon the specific specifications required for a particular application. The data handler unit 50 comprises a local address generator and control logic to facilitate interface of one of the CPUs to the note control bus 18 and the high bandwidth memory interface 14.

The node controller 16 performs several functions. The node controller 16 accepts a compiled flowgraph, which is typically entered by a user. A graphical flowgraph editor is optionally utilized to create and/or modify such flowgraphs. The node controller 16 also determines which tasks need to be implemented and then schedules those tasks. The node controller 16 also delegates the task to the processing elements 30, based upon the resources required to perform a particular task. The node controller also facilitates recovery from previously performed tasks so as to determine which other task may be performed next.

The node controller 16 communicates with the rest of the distributed memory addressing system of the present invention via the bi-directional node control bus 18, which interconnects all of the processing elements 30, 32, and 16 with all of the parallel memories 20. The node controller 16 thus uses the node control bus 18 to send tasks to the processing elements 30, 32, and 16. The processing elements 30, 32, and 16 use the node control bus 18 to send parameters to the parallel memories 20 and also to inform the node controller 16 when a particular task has been completed.

Referring now to FIG. 3, having previously described the structure of the present invention in detail, it may be beneficial to provide an example of the operation thereof. According to this example, operation starts 100 by providing a compiled flowgraph to the node controller 101. As those skilled in the art will appreciate, the compiled flowgraph may be provided via a number of different methods. For example, the compiled flowgraph may be downloaded to the node controller 16 via a floppy diskette or the like.

The node controller 16 utilizes the compiled flowgraph to determine which tasks are to be performed at a time 102. The node controller 16 dispatches a task to the first available processing element by transferring the task 103 to the node control bus 18 via its data handler unit 50.

A processing element's CPU 34 receives the task via its data handler unit 50. The processing element 30 then decodes the task and the parameters which it has received from the node controller 16.

When the node controller has an input/output task to be done 104, then if an input/output processor 32 is available 110, the input/output processor 32 will have a task dispatched to it 112 via the node controller 16. Otherwise, the node controller 16 waits 123 for the next input/output processor 32.

When a task is dispatched 112 to the input/output processor 32, then the input/output processor sends 106 out parameters to the shared memory 10.

When no more tasks are to be dispatched 104 then the application ends 130.

When additional tasks are dispatched 112 to the input/output processor 32 and the input/output processor sends 106 out parameters to the shared memory 10, then the input/output processor 32 performs input and output 107 data to and from the shared memory 10.

If there are more 125 input/output tasks, then the processing element 32 again sends 106 out parameters to shared memory 10. Otherwise, an input/output processor done command is sent 108 to the node controller 16.

For a processing element 32 task, a check is made to determine whether or not a processing element 32 is available 120. If no processing element 32 is available, then the system waits 124 for the next processing element 32.

If a processing element 32 is available 120, then a task is dispatched 113 to the processing element 32. If more 119 tasks remain to be done, then the node controller waits 124 for the next processing element 32 and repeats the cycle.

As is done for input/output tasks, the processor element 32 sends out parameters to memory 116 and the processor element inputs and outputs data to and from memory 117 as long as more processing element tasks 126 remain to be done. When no more tasks 126 remain to be done, then a processing element done command is sent to the node controller 118 and the node controller may send the processing element another task.

The processing element 30 then sends 106 and 116 the shared memory 10 addressing parameters via its associated data handler unit 50 and the node control bus 18. The processing element's data handler unit 50 then either receives the data to or from its associated CPU 34, based upon the addressing parameters to or from the shared memory 10, via time division multiplexing over the high bandwidth memory interface 14, until the task is completed 107 and 117.

The node controller 16 continues to dispatch tasks, as described above, to additional processing elements 30 in the distributed memory addressing system of the present invention, until all of the processing elements 30 are utilized. When all of the processing elements 30 are being utilized, then the node controller 16 waits 108 and 118 for a processing element to complete its task, and then issues the next task to be performed to the idle processing element 30. This process continues until all of the tasks have been performed or until the user stops the system.

Input/output functions are performed by the input/output processors 32, as data is required by the system, or must be output to other devices, e.g., displays, other processors, etc.

It is understood that the exemplary distributed memory addressing system described herein and shown in the drawings represents only a presently preferred embodiment of the invention. Indeed, various modifications and additions may be made to such embodiment without departing from the spirit and scope of the invention. For example, various configurations of parallel memories and various configurations of CPUs are contemplated. Thus, these and other modifications and additions may be obvious to those skilled in the art and may be implemented to adapt the present invention for use in a variety of different applications.

What is claimed is:

1. A distributed memory addressing system comprising:
   a) a plurality of separate processing elements each comprising at least one CPU;
   b) at least one input/output processing element comprising at least one CPU;
   c) a plurality of shared separate parallel memories in electrical communication with each of the processing elements by a high bandwidth interface; and
   d) the high bandwidth memory interface comprising;
      i) a network of serial two-way electrical connections to access the requested data, processor element read/write data and embedded direction control commands, for a fixed access latency from the shared parallel memories to every processing element and configured to provide non-blocking access to each parallel memory for each processing element; and
      ii) at least one dedicated two-way serial connection between each processing element to each parallel memory to communicate the data between each processing element and each parallel memory.

2. The distributed memory addressing system as recited in claim 1 further comprising a node controller communicating with said processing elements and said shared memory for providing parameters to said shared memory which are indicative of memory addresses required by said processing elements.

3. The distributed memory addressing system as recited in claim 2 wherein said node controller provides one of:
   a) a start address, an end address, and a stride; and
   b) a start address, a distance, and a stride.

4. The distributed memory addressing system as recited in claim 1 wherein each processing element comprises:
   a) a CPU;
   b) a local data memory for providing data to said CPU;
   c) a local program memory for providing program instructions to said CPU; and
   d) a peripheral interface to facilitate programming and display for said CPU.

5. The distributed memory addressing system as recited in claim 1 wherein said shared memory comprises 8 to 32 parallel memories and each parallel memory comprises two banks of RAM, each bank of RAM comprising 2 to 8 mega 32 bit words.

6. The distributed memory addressing assembly as recited in claim 1 wherein:
   a) each of said processing elements comprises a data handler unit in communication with the CPU(s) thereof;
   b) said shared memory comprises a plurality of parallel memories, each of said parallel memories comprising at least one bank of RAM and a memory management unit in communication with said bank of RAM; and
   c) said high bandwidth interface comprises a serial connection between each of said processing elements and each of said parallel memories.

7. The distributed memory addressing system as recited in claim 3 wherein said node controller is configured to accept a compiled flowgraph so as to facilitate processing.

8. The distributed memory addressing system as recited in claim 3 wherein said node controller is configured to schedule tasks to be performed.

9. The distributed memory addressing assembly as recited in claim 3 wherein said node controller is configured to delegate tasks to selected processing elements.

10. The distributed memory addressing system as recited in claim 3 further comprising a bi-directional node control bus for interconnecting the processing elements and the parallel memories.

11. The distributed memory addressing system as recited in claim 10 wherein the node controller is configured to delegate tasks to the processing elements via the node control bus and the processing elements are configured to send parameters to the parallel memories via the node control bus.

12. The distributed memory addressing assembly as recited in claim 11 wherein the node control bus is configured as a token ring controlled bus.

13. A method for addressing distributed memory, said method comprising;
   a) processing performed by a plurality of separate processing elements, including at least one input/output processing element, each processing element comprising at least one CPU;
   b) storing data in a shared memory; and
   c) communicating between the processing elements and the shared memory through a high bandwidth interface comprising a network of serial two-way electrical connections to access the requested data, processor element read/write data and embedded direction control commands, for a fixed access latency from the shared memory to every processing element and configured to provide non-blocking access to each parallel memory for each processing element and at least one dedicated two-way serial connection between each processing element to each parallel memory to communicate the data between each processing element and each parallel memory.

14. The method as recited in claim 13 further comprising the step of providing parameters to the shared memory which are indicative of memory addresses for data required by the processing elements, the parameters being provided by a node controller which communicates with the processing elements and the shared memory.

15. The method as recited in claim 14 further comprising at least one of the steps of:
   a) providing a start address, an end address, and a stride via the node controller; and
   b) providing a start address, a distance, and a stride via the node controller.

16. The method as recited in claim 13 wherein each processing element comprises:
   a) a CPU;
   b) a local data memory for providing data to said CPU;
   c) a local program memory for providing program instructions to said CPU; and
   d) a peripheral interface to facilitate programming and display for said CPU.

17. The method as recited in claim 13 wherein the shared memory comprises 8 to 32 parallel memories and each parallel memory comprises 2 banks of RAM, each bank of RAM comprising 2 to 8 mega 32 bit words.

18. The method as recited in claim 13 wherein:
   a) each of said processing elements comprise a data handler unit in communication with the CPU(s) thereof;
   b) said shared memory comprises a plurality of parallel memories, each of said parallel memories comprising at least one bank of RAM and a memory management unit in communication with said bank of RAM; and
   c) said high bandwidth interface comprises a serial connection between each of said processing elements and each of said parallel memories.

19. The method as recited in claim 17 further comprising the step of accepting a compiled flowgraph by the node controller so as to facilitate processing.

20. The method as recited in claim 15 further comprising the step of scheduling task to be performed.

21. The method as recited in claim 17 further comprising the step of delegating task to selected processing elements via the node controller.

22. The method as recited in claim 15 further comprising the step of interconnecting all of the processing elements and all of the parallel memories via a bi-directional node control bus.

23. The method as recited in claim 22 further comprising the step of the node controller delegating tasks to the processing elements via the node control bus and the processing elements being configured to send parameters for the parallel memories via the node control bus.

24. The method as recited in claim 23 further comprising the step of controlling the node control bus via token ring protocol.

25. A method for addressing distributed memory, the method comprising of:

a) communicating a compiled flowgraph to a node controller;
b) determining the task to be performed via the node controller;
c) delegating the task to a first available processing element via the node controller by communication via a node control bus to a data handler unit associate with the processing element;
d) communicating the task from the processing elements data handler unit to the processor's CPU;
e) decoding the task and parameters received from the node controller via the processing element;
f) sending shared memory addressing parameters from the processing element to the shared memory via the processing element's data handler unit and the node control bus;
g) communicating data with the processing element's CPU and the shared memory via the element's data handler unit, utilizing a high bandwidth memory interface comprising a network of serial two-way electrical connections to access the requested data, processor element read/write data and embedded direction control commands for a fixed access latency from the shared parallel memories to every processing element and configured to provide non-blocking access to each parallel memory for each processing element and at least one dedicated two-way serial electrical connection from each processing element to each parallel memory to communicate the data between each processing element and each parallel memory, until the task is completed;
h) upon completion of the task, the processing element informing the node controller that the task has been completed;
i) the node controller continuing to delegate task to additional processing elements per step (c) until all of the processing elements are utilized;
j) when all of the processing elements are busy, the node controller waiting for a processing element to complete its task and then issuing the next task to be performed to that processing element;
k) repeating steps (c) through (j) until all tasks have been performed; and
l) performing input/output functions by input/output processors as data is needed by the distributed memory addressing system as data is needed to be output to the other devices.

* * * * *